United States Patent
Nam et al.

(10) Patent No.: US 11,695,105 B2
(45) Date of Patent: Jul. 4, 2023

(54) RECHARGEABLE BATTERY

(71) Applicant: SES Holdings Pte. Ltd., Singapore (SG)

(72) Inventors: YoungGyu Nam, Woburn, MA (US); SangOh Jung, Winchester, MA (US); Qichao Hu, Arlington, MA (US); Yury Matulevich, Burlington, MA (US); Mackenzie King, Essex, MA (US); Yongkyu Son, Bedford, MA (US); Jeff Francois, Lynn, MA (US); Jacqueline Hong, Stoneham, MA (US); Arthur R. Nigro, Jr., Hopkinton, MA (US)

(73) Assignee: SES Holdings Pte. Ltd., Singapore (SG)

( * ) Notice: Subject to any disclaimer, the term of this patent is extended or adjusted under 35 U.S.C. 154(b) by 111 days.

(21) Appl. No.: 17/020,922

(22) Filed: Sep. 15, 2020

(65) Prior Publication Data

US 2020/0411916 A1    Dec. 31, 2020

Related U.S. Application Data

(63) Continuation of application No. 16/708,059, filed on Dec. 9, 2019, now abandoned.
(Continued)

(51) Int. Cl.
*H01M 4/04* (2006.01)
*H01M 10/44* (2006.01)
(Continued)

(52) U.S. Cl.
CPC ..... *H01M 4/0447* (2013.01); *H01M 10/0525* (2013.01); *H01M 10/281* (2013.01);
(Continued)

(58) Field of Classification Search
CPC .......... H01M 10/441; H01M 10/0525; H01M 10/281; H01M 10/647; H01M 10/0585;
(Continued)

(56) References Cited

U.S. PATENT DOCUMENTS 5,114,804 A * 5/1992 Stiles .................... H01M 10/42
                                                       29/623.5
5,670,272 A   9/1997 Cheu et al.
(Continued)

FOREIGN PATENT DOCUMENTS

EP     0957526 A1    11/1999
EP     1577967 A1     9/2005
(Continued)

OTHER PUBLICATIONS

Gireaud et al., Lithium metal stripping/plating mechanisms studies: A metallurgical approach; ScienceDirect Electrochemistry Communications 8 (2006) 1639-1649.
(Continued)

*Primary Examiner* — Jerry D Robbins
(74) *Attorney, Agent, or Firm* — Downs Rachlin Martin PLLC

(57) ABSTRACT

Battery core packs employing minimum cell-face pressure containment devices and methods are disclosed for minimizing dendrite growth and increasing cycle life of metal and metal-ion battery cells.

17 Claims, 7 Drawing Sheets

Related U.S. Application Data

(60) Provisional application No. 62/834,107, filed on Apr. 15, 2019, provisional application No. 62/834,101, filed on Apr. 15, 2019, provisional application No. 62/812,353, filed on Mar. 1, 2019, provisional application No. 62/812,322, filed on Mar. 1, 2019.

(51) Int. Cl.

| *H01M 10/28* | (2006.01) |
|---|---|
| *H01M 10/0525* | (2010.01) |
| *H01M 50/293* | (2021.01) |
| *H01M 50/291* | (2021.01) |
| *H01M 50/264* | (2021.01) |
| *H01M 50/211* | (2021.01) |

(52) U.S. Cl.
CPC ....... *H01M 10/441* (2013.01); *H01M 50/211* (2021.01); *H01M 50/264* (2021.01); *H01M 50/291* (2021.01); *H01M 50/293* (2021.01)

(58) Field of Classification Search
CPC .......... H01M 10/6555; H01M 50/211; H01M 50/264; H01M 50/291; H01M 50/293; H01M 4/0447
USPC ........................................................ 320/118
See application file for complete search history.

(56) References Cited

U.S. PATENT DOCUMENTS

| 6,303,248 | B1 | 10/2001 | Peterson | |
|---|---|---|---|---|
| 6,399,278 | B1* | 6/2002 | Leach | B41M 1/04 430/96 |
| 6,464,846 | B1* | 10/2002 | Titterington | C25B 9/66 204/286.1 |
| 6,908,711 | B2 | 6/2005 | Fauteux et al. | |
| 9,476,946 | B2 | 10/2016 | Schlag et al. | |
| 9,484,592 | B2 | 11/2016 | Roh et al. | |
| 9,620,809 | B2 | 4/2017 | Turon Teixidor et al. | |
| 9,634,295 | B2 | 4/2017 | Dube | |
| 9,748,541 | B2 | 8/2017 | Burke | |
| 9,887,415 | B2 | 2/2018 | Fischer et al. | |
| 9,911,951 | B2 | 3/2018 | DeKeuster et al. | |
| 11,581,530 | B2* | 2/2023 | Laramie | H01M 4/0471 |
| 2005/0153209 | A1* | 7/2005 | Vallee | H01M 50/414 429/231.95 |
| 2006/0240290 | A1* | 10/2006 | Holman | H01M 4/134 429/231.95 |
| 2009/0147441 | A1* | 6/2009 | Yoshida | H01G 11/18 361/502 |
| 2009/0155676 | A1* | 6/2009 | Zhamu | H01M 50/446 429/129 |
| 2009/0325034 | A1* | 12/2009 | Kobayashi | H01M 8/04149 261/3 |
| 2010/0248026 | A1* | 9/2010 | Hinoki | H01M 50/46 429/209 |
| 2011/0217621 | A1* | 9/2011 | Felix | H01M 4/8605 429/492 |
| 2012/0060361 | A1 | 3/2012 | Reis | |
| 2012/0263984 | A1* | 10/2012 | Krammer | B60L 58/27 429/82 |
| 2012/0328910 | A1* | 12/2012 | la O' | H01M 8/04186 429/81 |
| 2013/0189592 | A1* | 7/2013 | Roumi | H01M 8/0247 429/405 |
| 2014/0186723 | A1* | 7/2014 | Hallac | H01M 10/0569 429/341 |
| 2015/0037616 | A1* | 2/2015 | Wyatt | H01M 10/625 429/153 |
| 2015/0140397 | A1* | 5/2015 | Tajima | B32B 27/32 429/127 |
| 2015/0255781 | A1* | 9/2015 | Hashimoto | H01G 11/86 429/188 |
| 2017/0023328 | A1* | 1/2017 | Irvin | F41C 23/04 |
| 2017/0338475 | A1* | 11/2017 | Laramie | H01M 50/449 |
| 2018/0062147 | A1 | 3/2018 | Onoda et al. | |
| 2018/0151856 | A1 | 5/2018 | Fischer et al. | |
| 2018/0151918 | A1 | 5/2018 | Boovaragavan et al. | |
| 2019/0067711 | A1* | 2/2019 | Shiraki | H01M 8/0273 |
| 2020/0020990 | A1* | 1/2020 | Oba | H01M 10/0562 |
| 2020/0328401 | A1* | 10/2020 | Lecuyer | H01M 10/052 |
| 2021/0344082 | A1* | 11/2021 | Beck | H01M 50/46 |

FOREIGN PATENT DOCUMENTS

| WO | 2017214276 A1 | 12/2017 | |
|---|---|---|---|
| WO | WO-2017214276 A1 * | 12/2017 | ........ H01M 10/0525 |

OTHER PUBLICATIONS

Hirai et al., Influence of Electrolyte on Lithium Cycling Efficiency with Pressurized Electrode Stack, J. Electrochem. Soc., vol. 141, No. 3, Mar. 1994, The Electrochemical Society, Inc., pp. 611-614.

Barai et al., Impact of External Pressure and Electrolyte Transport Properties on Lithium Dendrite Growth; Journal of The Electrochemical Society, 165 (11) A2654-A2666 (2018).

Liu, Guangyu, The Role of Mechanical Stress and Deformation in Lithium Metal Battery Design; A dissertation submitted in partial fulfillment of the requirements for the degree of Doctor of Philosophy (Mechanical Engineering) University of Michigan; 2018. pp. 1-147.

Steiger Jens, Mechanisms of Dendrite Growth in Lithium Metal Batteries; Jan. 15, 2015, pp. 1-134.

\* cited by examiner ial Patent Application Ser. No. 62/812,353, filed Mar. 1, 2019, and titled "A LIGHTWEIGHT BATTERY
RECHARGEABLE BATTERY

RELATED APPLICATION DATA

This application is a continuation of U.S. Nonprovisional patent application Ser. No. 16/708,059, filed Dec. 9, 2019, which application claims the benefit of priority of U.S. Provisional Patent Application Ser. No. 62/812,353, filed Mar. 1, 2019, and titled "A LIGHTWEIGHT BATTERY CORE PACK FOR ELECTRIC AIRCRAFT," Ser. No. 62/812,322, filed Mar. 1, 2019, and titled "A LIGHTWEIGHT BATTERY CORE PACK FOR CONSUMER DRONE," Ser. No. 62/834,101, filed Apr. 15, 2019, and titled "A WEIGHT CONSTRAINED BATTERY PACK," and Ser. No. 62/834,107, filed Apr. 15, 2019, and titled "A VOLUME CONSTRAINED BATTERY PACK," each of which is incorporated by reference herein in its entirety.

FIELD OF THE DISCLOSURE

The present disclosure generally relates to rechargeable batteries. In particular, the present disclosure is directed to a battery core pack comprised of a plurality of cells.

BACKGROUND

A general structure of a lithium metal battery cell includes a lithium metal anode bonded to a copper current collector and a metal oxide cathode bonded to an aluminum current collector. Between the anode and cathode is a separator that allows lithium metal ions to move back and forth. A variety of different electrolyte solutions may be used between the cathode and anode. When a battery of this type discharges, lithium metal ions are stripped from the anode and travel to the cathode through the separator. During charging, the ion flow is reversed and the metal ions are re-plated back onto the anode. However, as is well-known in the art, the re-plating is often not uniform, resulting in the formation of dendrites extending out from the anode surface after a number of discharge/charge cycles. If left uncontrolled, dendrite growth may pierce the separator and cause a short of the cell after a relatively few cycles. The battery is greatly degraded when this happens.

The plating and striping of metal ions from the anode also cause individual cells to contract and then expand as the metal ions are stripped and then re-plated. Other battery types, for example lithium-ion batteries that use graphite or Si graphite anodes, also function based on ion stripping and re-plating and thus may undergo significant expansion and experience problematic dendrite growth on re-plating.

Current techniques for the control of the dendrite growth, in particular in lithium metal batteries, are less than satisfactory. New solutions are needed to extend battery life cycles.

SUMMARY OF THE DISCLOSURE

In one implementation, the present disclosure is directed to a battery core pack that includes a plurality of cells forming a cell stack, each cell comprising at least one anode and at least one cathode, wherein metal ions are stripped from the anode during discharge and re-plated on the anode during charge; and a containment structure at least partially surrounding the cell stack, wherein the containment structure imparts a substantially uniform surface pressure at certain value to the cell stack.

In another implementation, the present disclosure is directed to a battery pack that includes a plurality of cells forming a cell stack, each cell comprising at least one anode and at least one cathode wherein metal ions are stripped from the anode during discharge and re-plated on the anode during charge; a housing containing the cell stack with a pre-loaded surface pressure of at least about 50 psi, wherein the housing has sufficient stiffness to maintain the surface pressure through plural charge and discharge cycles of the cell stack; and at least two compliant pads, wherein each compliant pad is disposed between the cells, the compliant pads distributing the cell expansion pressure evenly during charging and pushing back to the cell during discharging.

In yet another implementation, the present disclosure is directed to a method of controlling dendrite growth on the anode of a metal or metal-ion battery cell, wherein the cell comprises at least one planar anode and at least one planar cathode and wherein material is stripped from the anode during cell discharge and re-plated on the anode during cell charge. The method includes assembling plural cells into a cell stack; positioning the cell stack within a containment structure, the containment structure at least partially surrounding the cell stack; and applying and maintaining a substantially uniform minimum surface pressure of at least about 50 psi across the cells of the cell stack with the containment structure.

BRIEF DESCRIPTION OF THE DRAWINGS

For the purpose of illustrating the disclosure, the drawings show aspects of one or more embodiments. However, it should be understood that the present disclosure is not limited to the precise arrangements and instrumentalities shown in the drawings, wherein.

DETAILED DESCRIPTION

Figure 11:
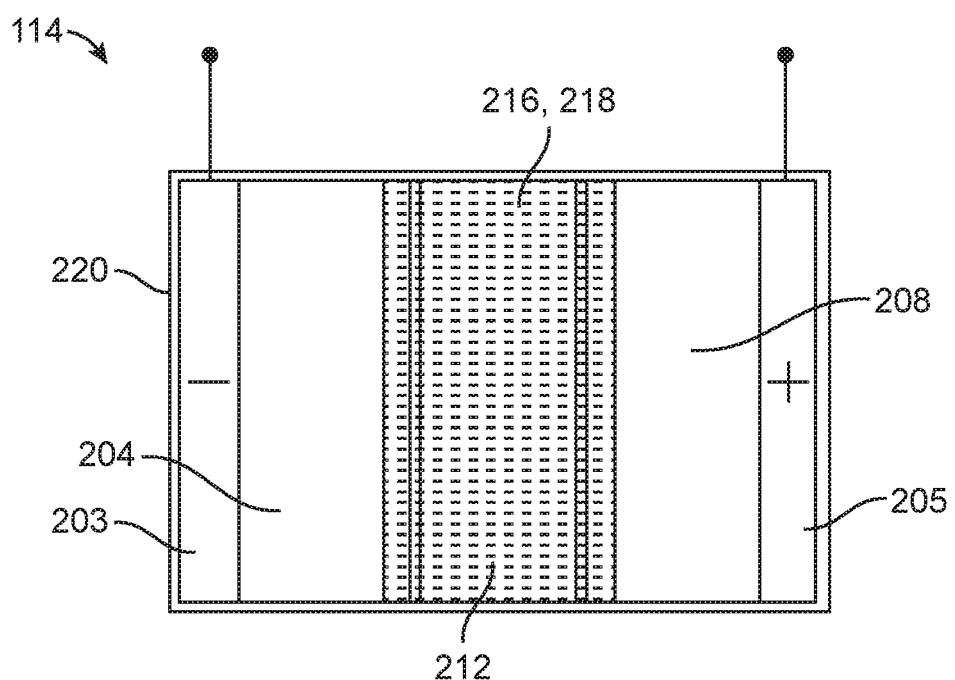
FIG. 11 is a cross-sectional view of a typical battery cell as may be used with embodiments of the present disclosure.

Lithium dendrite growth on the lithium metal anode surface in lithium metal batteries has been known to result in short circuits and general degradation of cell performance. These negative effects can arise after relatively few discharge/charge cycles. This disclosure presents, among other things, cell-face pressure control techniques that provide more uniform lithium plating and stripping and suppress dendritic lithium growth to extend the life of the battery. In one embodiment, a mechanically constrained, constant volume pack for multiple cells in a module or battery pack is provided. In another embodiment, a substantially "constant" pressure, mechanically constrained system for multiple cells in a module or battery pack is provided. While the present disclosure is exemplified with lithium metal cells, as will be appreciated by persons of ordinary skill, the teachings contained herein with respect to techniques for encouraging more uniform plating and stripping, and suppressing dendritic anode surface growth are also applicable to other metal and metal-ion battery types (an illustration of a lithium metal cell suitable for use with embodiments disclosed herein is shown in FIG. 11).

Figure 1:
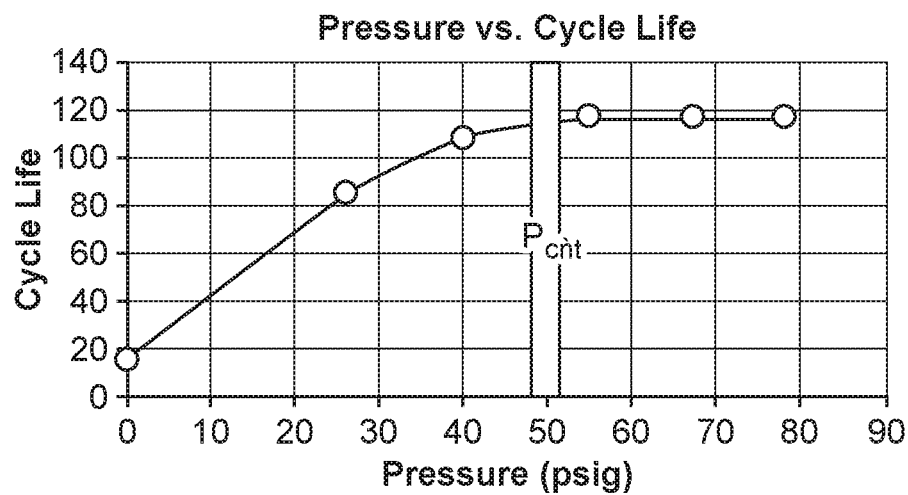
FIG. 1 is a plot of battery Cycle Life versus cell-face Pressure for embodiments of the present disclosure.

FIG. 1 shows the cycle life of the cell when the cell is under different pressure. The pressure is uniformly applied to both surfaces of the cell. It is shown that the dendrite growth is well constrained, and the number of the cycle life changes slightly when the applied pressure is above 50 psi. Thus, in order to obtain a larger number of cycle life, the pressure applied to the surfaces of each cell above 50 psi is a critical pressure to control the dendrite growth. As shown in FIG. 1, at pressures below this critical pressure, the number of the cycle life drops off significantly, whereas at pressures above the critical pressure the number is maintained around 120. With substantially uniform pressure applied to both surfaces of the cell at or above the critical pressure, the cycle life of the cell is improved, indicating that the dendrite growth is effectively suppressed by the substantially uniform pressure.

FIGS. 2-5 illustrate a constant volume approach to maintain surface pressure above the critical level, and FIGS. 6-9 illustrate a "constant pressure" approach.

Figure 2:
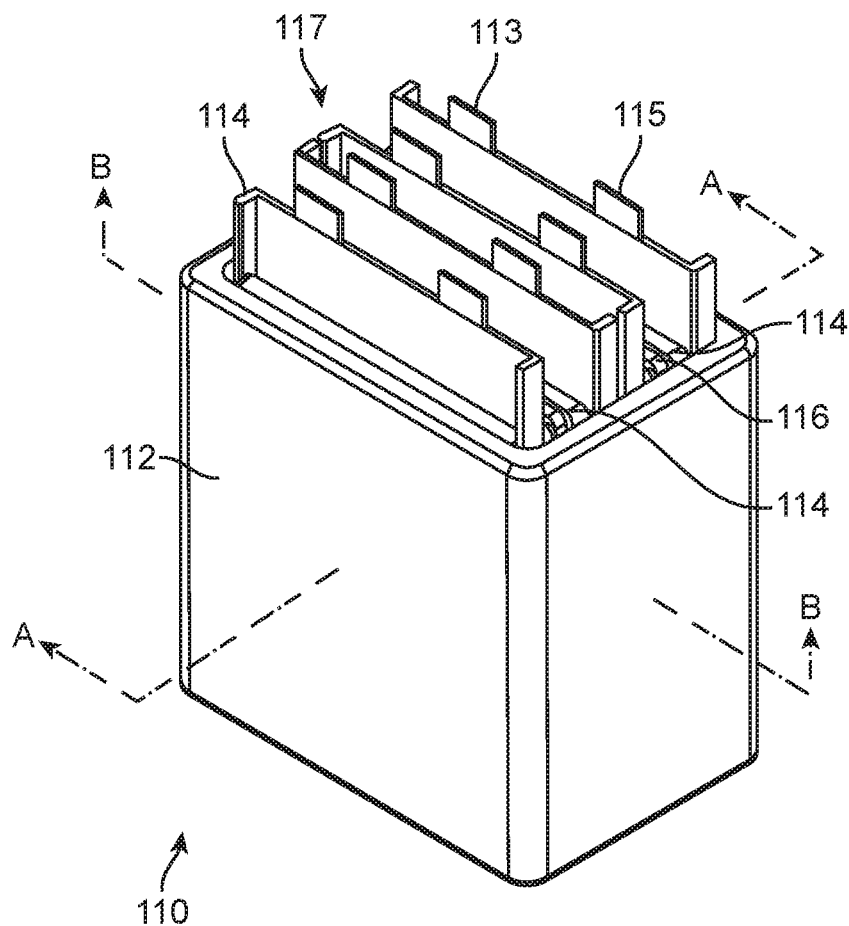
FIG. 2 is a perspective view of an embodiment of a battery core pack as disclosed herein.
Figure 3:
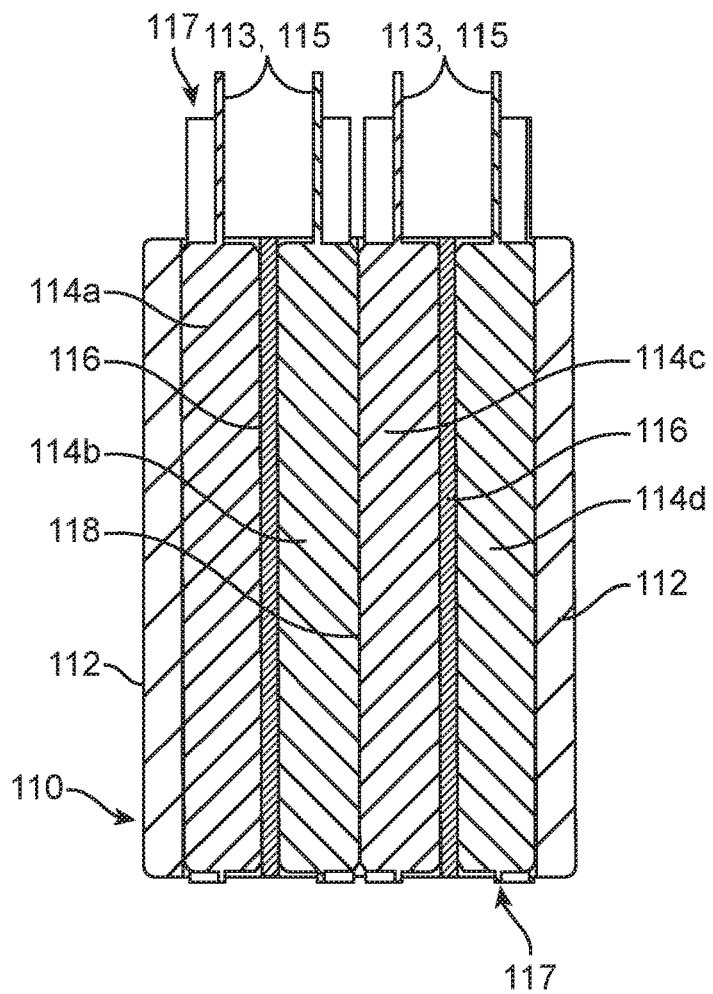
FIG. 3 is a cross-sectional view of the embodiment of FIG. 2 as viewed through section line A-A in FIG. 2.
Figure 4:
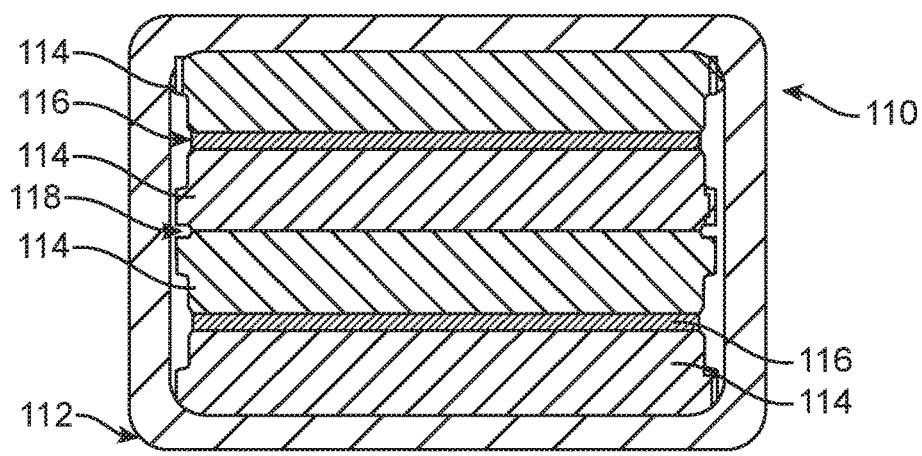
FIG. 4 is a cross-sectional view of the embodiment of FIG. 2 as viewed through section line B-B in FIG. 2.

FIG. 2 is a perspective view of a battery pack in accordance with one embodiment of the present disclosure. The battery pack 110 includes a hollow housing 112 having two openings 117 (FIG. 3) in a longitudinal direction and enclosing a constant volume. The housing 112 may contain a plural of battery cells 114, each cell having anode 113 and cathode 115. In the present example, four cells 114 are shown in FIGS. 3 and 4, and the battery pack 110 comprising the four cells has a capacity of 3 Ah. A practical limit on cell number in a constant volume embodiment is accommodation of force created by natural cell expansion as metal ions are re-plated to the anode. As the number of cell increases, the total pack dendritic growth increases, resulting in an increased force applied to the battery pack. The housing 112 is made of rigid material, and is sized and configured to constrain the expansion so as to maintain the proper pressure at all times to limit dendrite growth as described herein. It is shown that the four cells design is a practical compromise between various aspects, e.g., pack size/capacity, housing strength, size and weight and charge density specifications. The housing 112 may be constructed from a glass fiber impregnated polymeric machined rectangular tube. Alternatively, a section of carbon fiber square tube or other materials exhibiting similar strength, lightness and stiffness characteristics may be used.

FIGS. 3 and 4 are cross-sectional views of the battery pack of the present disclosure viewed in the directions of A-A and B-B, respectively. The battery pack 110 further includes compliant pads 116 placed between the first 114a and second cells 114b, and third 114c and fourth cells 114d, respectively. A compliant pad means a pad may distribute the cell expansion pressure evenly during charging and pushes back to the cell during discharging. A cooling pad 118 is also placed between the second 114b and third cells 114c to dissipate heat. In general, the X-Y dimensions of the compliant pad 116 may correspond to that dimension of cells 114a-d, while the thickness of the compliant pad 116 is determined by the expansion extent of the cell and is optimized between the variables of allowed battery pack volume and durometer rating of the pad to control cell-face pressure at the desired level, e.g., at or above 50 psi. In one example, the compliant pad may be made of polyurethane sheet with a dimension of approximately 2.8 inches×1.8 inches, with a thickness of approximately 0.625 inches, and such pad may allow a cell expansion of 20%. Examples of suitable polyurethane sheet properties are provided in Table 1 below.

TABLE 1

| Durometer Shore | 40 A | 60 A | 80 A | 90 A |
| --- | --- | --- | --- | --- |
| 100% Modulus, psi (Mpa) | 130 (0.89) | 220 (1.52) | 600 (4.1) | 1100 (7.6) |
| 300% Modulus, psi (Mpa) | 270 (1.86) | 460 (3.17) | 1000 (6.9) | 2200 (15.2) |
| Tensile Strength, psi (Mpa) | 840 (5.79) | 4100 (28.2) | 6700 (46.2) | 5500 (37.9) |
| Elongation % | 490 | 490 | 660 | 430 |
| Die C Tear, pli (kN/m) | 130 (22.8) | 200 (35) | 475 (83.1) | 700 (123) |
| Bashore Resilience % | 37 | 22 | 31 | 40 |
| Compression Set, Method B, 22 hrs @ 158° F. | 10 | 2 | 29 | 36 |
| Compression Modulus, psi (Mpa) | | | | |
| 5% | 20 (0.14) | 30 (0.21) | 220 (1.5) | (not given) |
| 10% | 30 (0.21) | 40 (0.28) | 330 (2.3) | |
| 15% | 38 (0.26) | 55 (0.38) | 390 (2.7) | |
| 20% | 46 (0.32) | 70 (0.48) | 520 (3.6) | |
| 25% | 55 (0.38) | 115 (0.79) | 670 (4.6) | |
| Specific Gravity | 1.22 | 1.24 | 1.25 | 1.13 |

The cooling pad 118 may comprise a thin sheet of metal with a high thermal conductivity, such as copper or aluminum. Heat may be dissipated radiantly, for example by exposure of an edge of the cooling pad to ambient conditions or by attachment to a heat sink. Alternatively, the cooling pad 118 may comprise a sheet of material provided with small passages for circulation of cooling fluid therein.

As discussed above, the material and thickness of the compliant pad 116 are selected to cause a linear and uniform pressure distribution across the surface of each cell 114a-d in the present example. It has been found that if the pressure is not maintained substantially uniform across the surface of the cells, "hot spots" with greater dendrite growth may develop, which may lead to early failure of a cell. In order to ensure the critical pressure of about 50 psi, the interior cavity size of the housing 112 is selected in combination with the uncompressed height of the stack of cells, compliant pads and the cooling pad such that an initial compression of the stack to the size of the rigid housing opening imparts the desired critical surface pressure to the cell stack when placed into the housing 112. In other words, the cell stack's surface pressure is a function of the compression to the opening size through which the stack is inserted. The interior cavity of the housing 112 for the battery pack thus may manage the pressure applied on the surface of the cell and suppresses the dendrite growth for improved cycle life.

Although the present example shows the 6 mAh of a 4-cell battery pack, the number of cycle life may be properly maintained if more or less cells are used, as long as the pressure applied to each cell of the battery pack is at least at or above the critical pressure, i.e., 50 psi.

Figure 5:
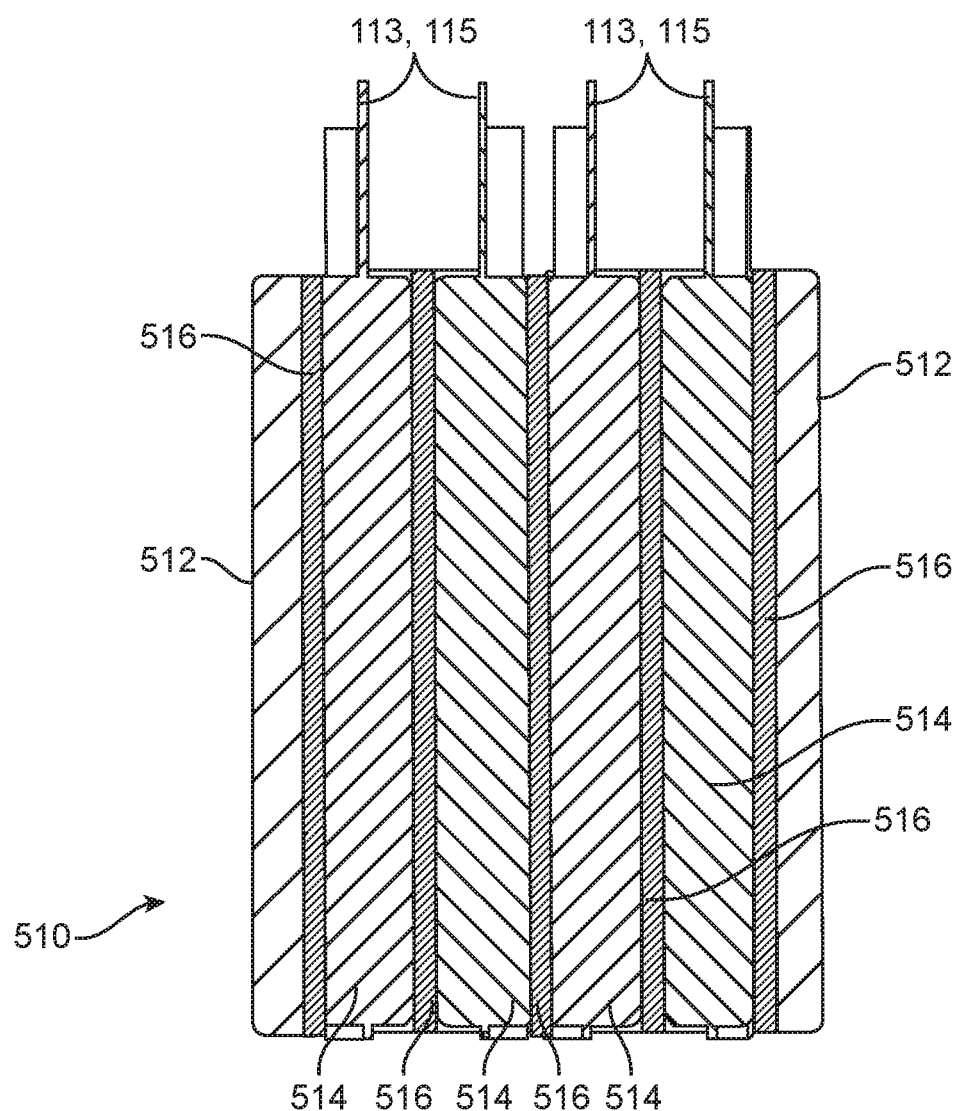
FIG. 5 is a cross-sectional view of an alternative embodiment of the present disclosure, as viewed through section line A-A of FIG. 2.

In an alternative embodiment, as shown in FIG. 5, the battery pack 510 employs five compliant pads 516, each being sandwiched between cells 514 and/or between the cell 514 and the inner wall of the housing 512. In one example of this alternative embodiment, the compliant pad is approximately 58 mm in length and 48 mm in width. Each compliant pad 516 has an approximate 3.175 mm (0.125 inches) thickness. Similarly, the pad may be made of a polyurethane sheet material with a smooth surface texture and material properties as identified above in Table 1. The five-pad embodiment described herein may provide a cell with a gravimetric energy density of >350 Wh/Kg and volumetric energy density of >590 Wh/L at 30% SoC (state of charge).

A further alternative embodiment employing an elastically expandable, mechanical containment system is shown in FIGS. 6-9. Persons of ordinary skill will appreciate that the elastic members described below exert an increasing force as they are expanded, however, the change in the pressure applied to the cell surface in this example is substantially less than the change in the pressure experienced by the cell within the constant volume housing as described above. In the embodiment as shown in FIG. 2, the pressure applied by the housing 110 to the cells increases as the cells expand.

Figure 6:
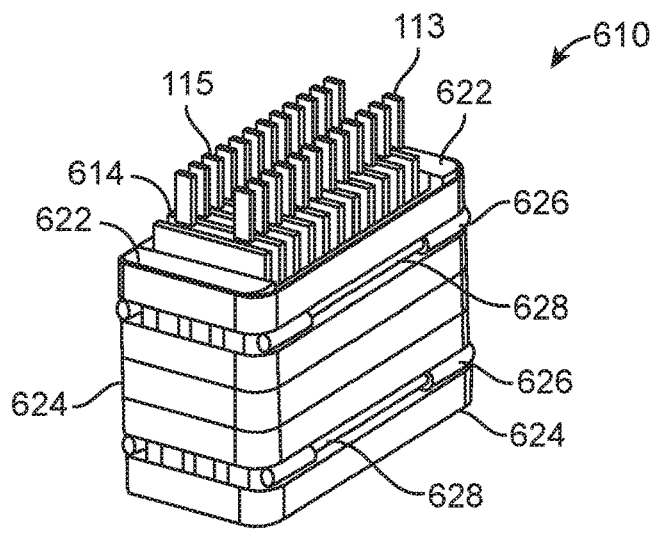
FIG. 6 is a perspective view of another alternative embodiment of the present disclosure.
Figure 7:
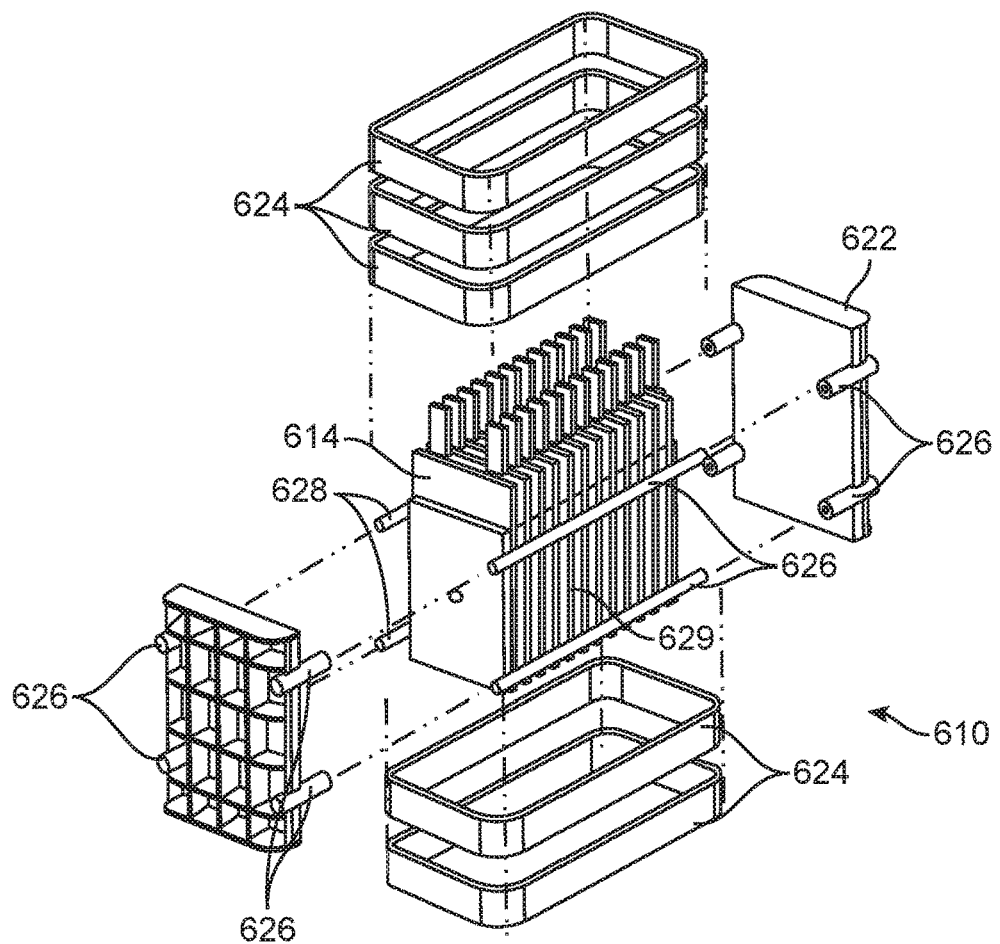
FIG. 7 is an exploded perspective view of the embodiment of FIG. 6.
Figure 8:
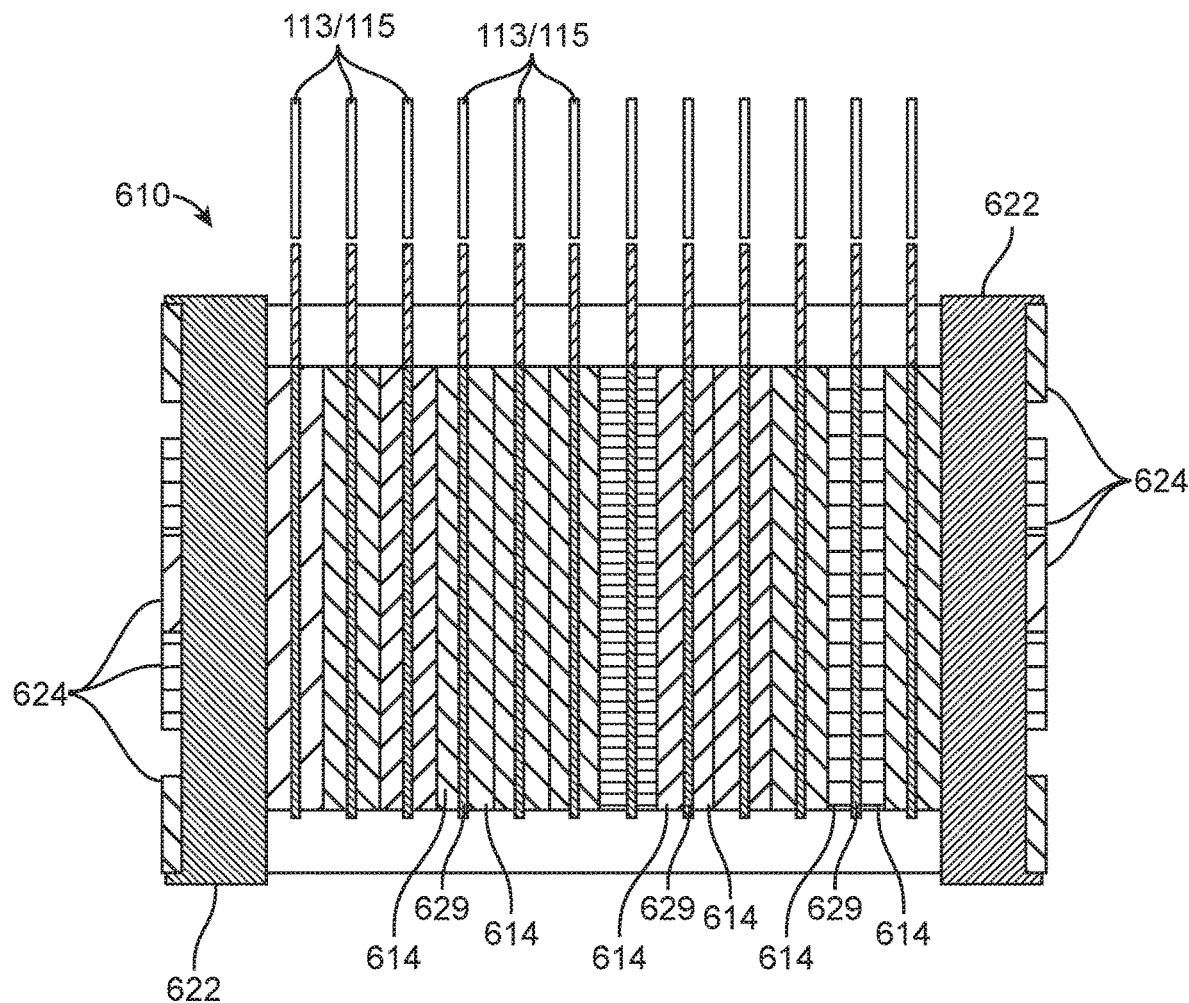
FIG. 8 is a longitudinal cross-section view of the embodiment shown in FIGS. 6 and 7.

Turning to FIGS. 6, 7 and 8, a battery pack 610 comprises plural cells 614, in the illustrated example twelve cells, constrained between a pair of end plates 622. One or more elastic members 624 surround the stack of the cells 614 and endplates 622 to apply continuous constraining force. The elastic members 624 may store energy when the battery is being charged (expanding) and constantly maintains a compression force between the pair of end plates 622. The elastic member 624 is selected to apply a force on the endplates 622 that results in the critical surface pressure of about 50 psi as previously explained. In one example, the elastic members 624 may have a rectangular cross-sectional shape with a K (spring constant) over time of 5.43 lb/in (approximately 5.16 N/mm). The inner circumference of the elastic member in one example is approximately 4 inches (101.6 mm) with a flat length of approximately 2 inches (50.8 mm); width is approximately 0.5 inches (12.7 mm) and thickness approximately 0.125 inches (3.175 mm). A cell stack as constructed in this example may expand by about 20% due to plating and re-plating of the anodes during charging cycles. In another example, the elastic member may have an inner diameter of about 1.25 inches and an outer diameter of about 1.5 inches.

In order to maintain a substantially even surface pressure across cell faces during expansion and contraction, the end plates 622 are each provided with four collars 626, two on each side in the length direction. Each collar 626 is provided with a hole to accommodate a guide member 628 inserted therein. The guide member 628 may slide into the hole of the collar 626 and achieve a clearance fit therebetween. This may limit the expansion in width direction and apply evenly distributed pressures on both sides of the battery pack 610. The length of the collar 626 is sized to be sufficient to resist binding or excessive friction with the guide member 628 if eccentric loads are experienced in expansion or contraction of the cell stack. For example, in one example, the guide member 628 is constructed of composite epoxy resin structure with a tensile strength of 600 kpsi, modulus of elasticity of 34 Mpsi. In this example, the guide member may be about 3.70 inch (94 mm) in length and weigh about 1.2 grams.

Figure 9:
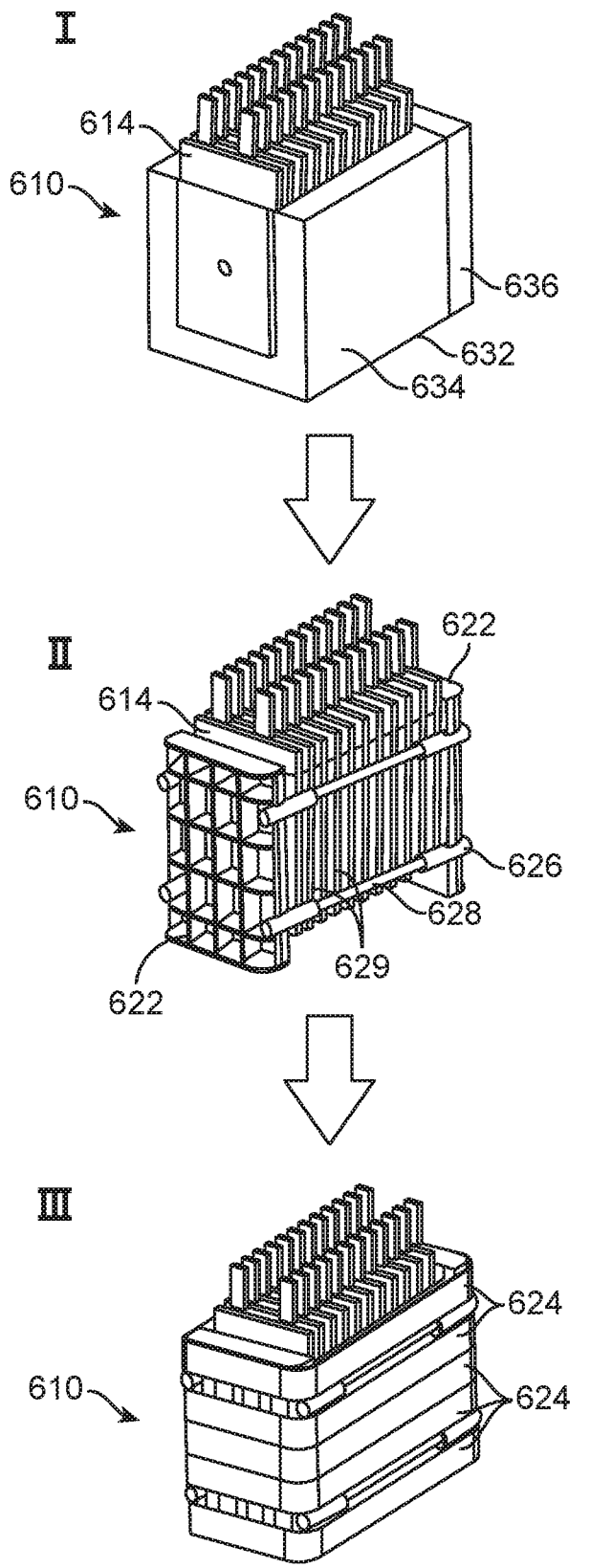
FIG. 9 is an exploded schematic view showing an assembly process for the embodiment of FIG. 6.

FIG. 9 illustrates a prospective view of assembly process of battery pack 610. At step I, a plurality of cells 614 are initially assembled together in a fixture 632 by using adhesive pads 629 (Step II) placed there between. A variety of suitable adhesive materials may be used as the adhesive pad, for example double-sided acrylic foam tape. The fixture 632 includes a cavity member 634 and a backing plate 636, which define a cavity therein. The stack of the cells 614 is accommodated within the cavity. After the cells are assembled together, the fixture 632 is removed. At step II, the stack of the cells 614, held together by adhesive pads 629, is inserted to a space defined by the endplates 622 and the guide members 628. At step III, the elastic members 624 are placed around the assembly of the stack of the cells 614, endplates 622 and guide members 628. Then, the assembly of the battery pack is complete.

Figure 10:
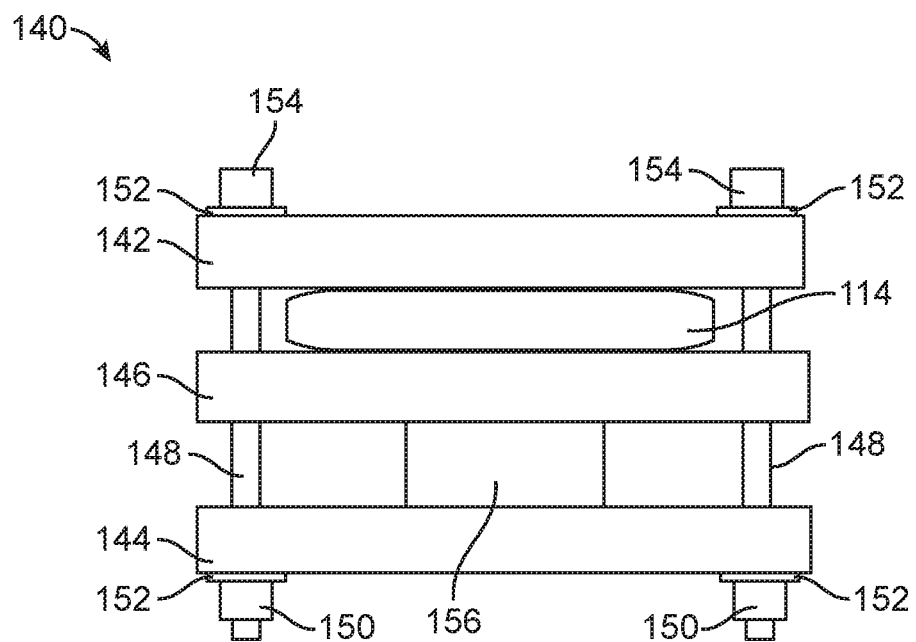
FIG. 10 is a schematic side view of an apparatus used to test the pressure of the cell surface.

FIG. 10 shows the apparatus used to test the surface pressure of the cell. To test the effect of surface pressure on dendrite growth and cycle life, a cell was placed in a test apparatus. The uniform pressure could be applied and measured over multiple discharge/charge cycles. The test apparatus 140 as schematically depicted herein includes a top plate 142, a bottom plate 144 and a middle plate 146, which are rigidly held together through threaded fasteners 148 at corners. To ensure the assembly of the test apparatus 140, four nuts 150 are also used. A section of each threaded fastener 148 is lubricated to prevent the friction. Each fastener 148 passes through a bushing in the plates to prevent eccentric loading of the fasteners. The fastener 148 is used together with a washer 152 and a top nut 154 to ensure the assembly of the test apparatus during tests. A force sensor 156 (e.g., a load cell) is sandwiched between the middle plate 146 and the bottom plate 144. The battery cell 114 to be tested is placed between the top plate 142 and the middle plate 146. A torque wrench is used to provide a precise tightening torque on each top nut 154 so as to provide a uniform pressure across the surface of the battery cell 114. In one illustrative example, the uniform surface pressure is set to 50 psi by applying a torque 6 lb-f onto each top nut 154. The force sensor 156 allows the initial pressure to be precisely set and then monitors changes throughout the cycle. The pressure exerted on the cell 114 is calculated from the force sensor output and the surface area of cell 114.

FIG. 11 illustrates an example cell 114 as used in embodiments disclosed herein such as battery core packs 10 and 610. FIG. 11 illustrates only some basic functional components of a cell 114. A real-world instantiation of the cell will typically be embodied using either a wound or stacked construction including other components, such as electrical terminals, seal(s), thermal shutdown layer(s), and/or vent(s), among other things, that, for ease of illustration, are not shown in FIG. 11. In the illustrated example, cell 114 includes a spaced-apart cathode 208 and anode 204, and a pair of corresponding respective current collectors 203, 205. A dielectric separator 212 is located between the cathode and anode 208, 204 to electrically separate the cathode and anode but to allow lithium ions, ions of an electrolyte 216, and ions of a redox shuttle additive 218 to flow therethrough. The separator may be porous. The separator 212 and/or one, the other, or both of cathode 208 and anode 204 may also be impregnated with the electrolyte 216 and additive 218. The cell 114 includes a container 220 that contains the current collectors 203, 205, cathode 208, anode 204, separator 212, and electrolyte 216.

The cathode and anode 208, 204 may comprise a variety of different structures and materials compatible with lithium-metal ions and electrolyte 216. Each of the current collectors 203, 205 may be made of any suitable electrically conducting material, such as copper or aluminum, or any combination thereof. The separator 212 may be made of any suitable porous dielectric material, such as a porous polymer, among others.

The cathode 208 may be formed from a variety of materials such as a material of the general formula of LixMyOz, where M is a transition metal such as Co, Mn, Ni, V, Fe, or Cr, and x, y, z are chosen to satisfy valence requirements. In one or more embodiments, the cathode is a layered or spinel oxide material selected from the group comprising of $LiCoO_2$, $Li(Ni_{1/3}Mn_{1/3}Co_{1/3})O_2$, $Li(Ni_{0.8}Co_{0.15}Al_{0.05})O_2$, $LiMn_2O_4$, $Li(Mn_{1.5}Ni_{0.5})_2O_4$, or their lithium rich versions. In one or more embodiments, the cathode material is $LiCoO_2$ (charged to 4.4V vs. Li metal), NCA or NCM (622, 811) (charged to 4.30V vs. Li metal).

The anode 204 may be a thin lithium metal anode that, in the discharged state has a thickness in the range of 10 μm-100 μm, or 20 μm-80 μm, or 40 μm-60 μm. Although FIG. 11 schematically shows anode 204 adjacent current collector 203, the anode material, e.g., sheets or films of lithium metal may be disposed on both sides of the current collector. In another example, the cell 114 may have an anodeless design, where the cell simply includes the anode current collector 203 and the cathode 208. The lithium ions are deposited on the anode current collector 203 during initial cell charging to form lithium anode 204. Further information regarding example materials and constructions of the cell 114 can be found in PCT publication number WO 2017/214276, titled, "High energy density, high power density, high capacity, and room temperature capable 'anode-free' rechargeable batteries," which is incorporated by reference herein in its entirety.

The redox shuttling additive 218 may be any of a variety of redox shuttling additives known in the art, for example, 2,5-Di-tert-butyl-1,4-bis(2-methoxyethoxy)benzene (DBBB), 2,5-Di-tert-butyl-1,4-bis(methoxy)benzene (DDB), 2,5-Di-tert-butyl-1,4-bis(2,2,2-trifluoroethoxy)benzene (DBDFB), 2,5-Di-tert-butyl-1,4-bis(2,2,3,3-tetrafluoropropyloxy)benzene (DBTFP), 2,5-Di-tert-butyl-1,4-bis(4,4,4,3,2,2-hexafluorobutyloxy)benzene (DBHFB), 2,7-Diacetylthiathrene, 2,7-Dibromthianthrene, 2,7-diisobutanoylthianthrene, 2-acetylthianthrene, 2,5-Difluoro-1,4-dimethoxybenzene (DFDB), 2-(Pentafluorophenyl)-tetrafluoro-1,3,2-benzodioxaborole, Li2B12F12, Tetraethyl-2,5-di-tert-butyl-1,4-phenylene diphosphate (TEDBPDP), 1,4-Bis[bis(1-methylethyl)phosphinyl]-2,5-dimethoxybenzene (BPDB), 1,4-Bis[bis(1-methyl)phosphinyl]-2,5-difluoro-3,6-dimethyoxylbenzene (BPDFDB), Pentafluoro-phenyl-tetrafluorobenzyl-1,2-dioxoborone (PFPTFBDB), Ferrocene and their derivatives, phenothiazine derivatives, N,N-dialkyl-dihydrophenazine, 2,2,6,6-tetramethylpiperinyloxide (TEMPO), $Li_2B_{12}H_{12-x}F_x$ (x=9 and 12).

In a further alternative embodiment, as described in more detail in the foregoing incorporated PCT application, the separator may comprise a porous polymer film having a porosity of greater than 50% and thickness of less than 12 μm. In such an embodiment, a non-aqueous liquid electrolyte may be selected to have electrochemical stability at a potential of the cathode material versus lithium. Examples of the non-aqueous liquid electrolyte comprise an organic solvent composed of at least one solvent selected from the group consisting of ethylene carbonate, propylene carbonate, dimethoxyethane, diethoxyethane, triglyme, tetraglyme, diethylether, and methybutylether, and at least one lithium imide salt having a fluorosulfonyl (FSO2) group having a concentration of between 2 mole per liter of the organic solvent and 10 moles per liter of the organic solvent.

Further features and alternative embodiments of the present disclosure are outlined in this and the following paragraphs. In one embodiment, a battery core pack comprises a plurality of battery cells forming a cell stack, with each cell comprising at least one planar anode and at least one planar cathode wherein material is stripped from the anode during cell discharge and re-plated on the anode during cell charge. A containment structure at least partially surrounds the cell stack, wherein the containment structure imparts substantially uniform minimum cell-face pressure to the cell stack of at least about 50 psi.

Battery cells may be designed to maintain a discharge capacity of greater than 2.5 Ah over at least 100 charge/discharge cycles. In one embodiment, such a battery core pack may comprise at least four cells with a core pack energy density of at least about 590 Wh/L at 30% SoC (state of charge). In another embodiment, the battery cells may comprise lithium metal cells.

In a further embodiment, the containment structure may comprise a rigid housing into which the cell stack is placed with a pre-loaded cell face pressure of at least about 50 psi with the rigid housing having sufficient stiffness to at least substantially maintain the minimum cell face pressure through plural charge and discharge cycles of the cell stack. In alternative embodiments, the battery core pack within the containment structure may include at least two compliant pads, wherein each compliant pad is disposed between two different cells. Compliant pads may comprise polyurethane sheet material with a Shore durometer of between about 40-90, and a Bashore resilience of between about 22-40%.

In another alternative embodiment, the battery core pack may also include comprising a cooling pad disposed between two of the battery cells. The cooling pad may comprise a metal with a thermal conductivity of at least about 150 $W \cdot m^{-1} \cdot K^{-1}$.

In yet another embodiment, the containment structure for the battery core pack may comprise first and second end-plates on opposite ends of the cell stack, at least one elastic member surrounding the cell stack and end plates to impart the minimum cell-face pressure to the cell stack, and guide rods extending between the endplates to limit motion of the cell stack due to expansion and contraction during charge and discharge cycles to a single degree of freedom substantially perpendicular to the cell faces. Sliding collars may be provided on the end plates wherein the guide rods are configured to be slidingly received in a sliding collar at each end.

In some embodiments, four of the guide rods and eight of the sliding collars are provided, wherein each sliding collar is disposed on the end plates approximately adjacent a corner of the end plate and wherein the guide rods and sliding collars cooperate to permit expansion and contraction of the cell stack in a direction substantially perpendicular to the cell faces while limiting twist, skew or bending of the cell stack to maintain the substantially uniform minimum pressure across the cell faces.

Further alternative embodiments with elastic member may comprise plural elastic members with each having a spring constant of at least approximately 5.43 lb/in. There may be twelve cells in a cell stack. There also may be an adhesive layer between each cell.

Embodiments disclosed herein may include battery cells comprising lithium metal battery cells, lithium-ion battery cells and magnesium metal battery cells.

In yet another alternative embodiment, a battery core pack may comprise a plurality of battery cells forming a cell stack with each cell comprising at least one planar anode and at least one planar cathode wherein material is stripped from the anode during cell discharge and re-plated on the anode during cell charge. A rigid housing contains the cell stack with a pre-loaded cell-face minimum pressure of at least about 50 psi, wherein the rigid housing has sufficient stiffness to maintain the minimum cell face pressure through plural charge and discharge cycles of the cell stack, and at least two compliant pads, each disposed between two different cells. Such an embodiment may comprise a cell stack of four cells. Alternatively, a cooling pad formed of a high conductivity material may be disposed between a center two cells of the cell stack. In another alternative five compliant pads are provided, with one between each pair of cells and one between each end cell of the cell stack and the rigid housing.

In still further embodiments, a battery core pack may comprise a plurality of battery cells forming a cell stack, each cell comprising at least one planar anode and at least one planar cathode wherein material is stripped from the anode during cell discharge and re-plated on the anode during cell charge. First and second endplates are provided on opposite ends of the cell stack. Plural elastic members surrounding the cell stack and end plates impart a substantially uniform minimum cell-face pressure to the cell stack of at least about 50 psi. At least four substantially rigid guide rods extend between the endplates, and sliding collars disposed on the end plates approximately adjacent each corner of each end plate slidingly receive the guide rods. The sliding collars and guide rods are configured and dimensioned to limit motion of the cell stack due to expansion and contraction during charge and discharge cycles to a single degree of freedom substantially perpendicular to the cell faces. In further alternatives, the battery core pack may comprise five elastic members with a minimum spring constant of approximately 5.43 lb/in and may include an adhesive layer between each cell of the cell stack. Such a configuration may have twelve cells in the cell stack.

In another aspect of the present disclosure a method of controlling dendrite growth on the anode of a metal or metal-ion battery cell is described. The cell in this method may comprise at least one planar anode and at least one planar cathode, wherein material is stripped from the anode during cell discharge and re-plated on the anode during cell charge. A method of limiting dendrite growth in such a cell may comprise assembling plural cells into a cell stack and applying and maintaining a uniform minimum cell-face pressure across the cells of the cell stack of at least about 50 psi. In one alternative, the method of controlling dendrite growth in a battery cell may comprise applying and maintaining the minimum cell-face pressure in an orientation at least substantially perpendicular to the cell-faces.

In further alternative embodiments for controlling dendrite growth, applying and maintaining the minimum cell-face pressure may comprise positioning compliant pads between at least two pairs of cells in the cell stack, pre-loading the cell stack with the minimum cell-face pressure, and placing the cell stack within a rigid housing while maintaining the minimum cell-face pressure. In such an embodiment, the rigid housing is configured and dimensioned with sufficient stiffness to maintain the minimum cell face pressure through plural charge and discharge cycles of the cell stack.

In further alternative embodiments for controlling dendrite growth, applying and maintaining the minimum cell-face pressure may comprise placing the cell stack between two substantially rigid endplates, placing plural elastic members around the cell stack and endplates, wherein the elastic members are configured and dimensioned to have a minimum spring constant selected to apply the minimum cell-face pressure to the cell stack in an initial, unexpanded state. In such an embodiment a further step of limiting skew or twist of the endplates relative to one another and the cell stack may be included.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A battery core pack, comprising:
   a plurality of cells forming a cell stack, each cell comprising at least one anode and at least one cathode, wherein metal ions are stripped from the anode during discharge and re-plated on the anode during charge; and
   a containment structure at least partially surrounding the cell stack, wherein said containment structure imparts a substantially uniform surface pressure at certain value to said cell stack;
   wherein the substantially uniform surface pressure is at least about 50 psi; and
   wherein said anode comprises lithium metal.

2. The battery core pack of claim 1, wherein said cells maintain a discharge capacity of greater than 2.5 Ah over at least 100 charge/discharge cycles.

3. The battery core pack of claim 2, comprising at least four cells with a core pack energy density of at least about 590 Wh/L at 30% SoC.

4. The battery core pack of claim 1, wherein said containment structure comprises a housing into which the cell stack is placed, wherein the housing has openings at two ends.

5. The battery core pack of claim 4, further comprising at least one compliant pad, wherein the at least one compliant pad is disposed between two cells, and the thickness of the at least one compliant pad is determined by the expansion extent of the cell and is optimized between the variables of allowed battery pack volume and durometer rating of the compliant pad.

6. The battery core pack of claim 5, wherein said compliant pad comprises polyurethane sheet material with a Shore durometer of between about 40-90, and a Bashore resilience of between about 22-40%.

7. The battery core pack of claim 6, further comprising a cooling pad disposed between two cells.

8. The battery core pack of claim 1, wherein said containment structure comprises:
a mounting unit defining a variable space to accommodate the cell stack; and
at least one elastic member surrounding the mounting unit to impart said surface pressure to the mounting unit.

9. The battery core pack of claim 8, wherein the mounting unit comprises:
first and second endplates opposite to each other, each endplate comprising at least a pair of sliding collars provided on each side, respectively;
guide rods inserted into the sliding collars to limit motion of the cell stack due to expansion and contraction during charge and discharge cycles to a single degree of freedom substantially perpendicular to the cell faces wherein said guide rods are configured to be slidingly received in the sliding collar at each end.

10. The battery core pack of claim 9, comprising four said guide rods and eight said sliding collars, wherein each sliding collar is disposed on the end plates approximately adjacent a corner of the end plate and wherein said guide rods and sliding collars cooperate to permit expansion and contraction of the cell stack in a direction substantially perpendicular to the cell faces while limiting twist, skew or bending of the cell stack to maintain the substantially uniform minimum pressure across the cell faces.

11. The battery core pack of claim 10, wherein said at least one elastic member has a spring constant of at least approximately 5.43 lb/in.

12. The battery core pack of claim 1, wherein each cell further comprises a dielectric separator disposed between each anode and cathode pair.

13. The battery core pack of claim 12, wherein said lithium metal anodes comprise lithium metal with a thickness in the range of 10 µm-100 µm.

14. The battery core pack of claim 13, wherein each cell further comprises at least one of an electrolyte and redox shuttle additive impregnating one or more of the dielectric separator, anode and cathode.

15. A battery pack, comprising:
a plurality of cells forming a cell stack, each cell comprising at least one anode and at least one cathode wherein metal ions are stripped from the anode during discharge and re-plated on the anode during charge, wherein said cell stack comprises four cells and the at least one anode comprises lithium metal;
a housing containing the cell stack with a pre-loaded surface pressure of at least about 50 psi, wherein said housing has sufficient stiffness to maintain said surface pressure through plural charge and discharge cycles of said cell stack;
a cooling pad formed of a high conductivity material disposed between cells of said cell stack; and
at least two compliant pads, wherein each compliant pad is disposed between the cells, said compliant pads distributing the cell expansion pressure evenly during charging and pushing back to the cell during discharging.

16. A battery core pack, comprising:
a plurality of cells forming a cell stack, each cell comprising at least one lithium metal anode and at least one cathode, wherein lithium ions are stripped from the anode during discharge and re-plated on the anode during charge, said cells each further comprising—
a separator disposed between the at least one anode and at least one cathode, and
a non-aqueous liquid electrolyte selected to have electrochemical stability at a potential of the cathode material versus lithium; and
a containment structure at least partially surrounding the cell stack, wherein said containment structure imparts a substantially uniform surface pressure of at least about 50 psi across all cells of said cell stack.

17. The battery core pack of claim 16, wherein said lithium metal anodes comprise lithium metal with a thickness in the range of 10 µm-100 µm and said cathode comprises a material of the general formula of $Li_xM_yO_z$, where M is a transition metal comprising one of Co, Mn, Ni, V, Fe, or Cr, and x, y, z are chosen to satisfy valence requirements.

* * * * *